（12） United States Patent
Ooshima et al.

(10) Patent No.: US 10,810,770 B2
(45) Date of Patent: Oct. 20, 2020

(54) ROBOT SYSTEM, PROCESSING DEVICE AND TEACH PENDANT, HAVING EXTERNAL FORCE DISPLAYING FUNCTION

(71) Applicant: FANUC CORPORATION, Yamanashi (JP)

(72) Inventors: Nao Ooshima, Yamanashi (JP); Keita Maeda, Yamanashi (JP); Tomoyuki Yamamoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 302 days.

(21) Appl. No.: 15/948,104

(22) Filed: Apr. 9, 2018

(65) Prior Publication Data
US 2018/0293768 A1 Oct. 11, 2018

(30) Foreign Application Priority Data
Apr. 10, 2017 (JP) ................. 2017-077702

(51) Int. Cl.
*B25J 9/00* (2006.01)
*G06T 11/20* (2006.01)
(Continued)

(52) U.S. Cl.
CPC ........... *G06T 11/206* (2013.01); *B25J 9/1671* (2013.01); *B25J 13/06* (2013.01); *B25J 13/085* (2013.01);
(Continued)

(58) Field of Classification Search
CPC ....... G06T 11/206; G06T 19/00; G06T 17/10; G06T 19/20; G06T 2219/2016; G06T 2200/24; B25J 13/06; B25J 13/085; B25J 9/1671; B25J 19/02; B25J 9/1633; B25J 9/0009; B25J 19/00; Y10S 901/46; G05B 2219/40099
See application file for complete search history.

(56) References Cited

U.S. PATENT DOCUMENTS

2011/0320038 A1* 12/2011 Motoki ................ B25J 19/0008
700/245
2015/0258690 A1 9/2015 Naitou
2016/0354933 A1 12/2016 Sato

FOREIGN PATENT DOCUMENTS

JP H6-262563 A 9/1994
JP H7-219611 A 8/1995
(Continued)

*Primary Examiner* — Ian Jen
(74) *Attorney, Agent, or Firm* — Hauptman Ham, LLP

(57) ABSTRACT

A system for detecting and displaying an external force applied to a robot. Magnitude and direction of the detected external force are displayed by an image for visual and intuitive understanding. A robot system includes a robot; a detection section for detecting an external force applied to the robot; a conversion section for converting magnitude and direction of the external force detected by the detection section into a coordinate value of a three-dimensional rectangular coordinate system; an image generating section for generating a force model image representing the magnitude and direction of the external force by a graphic, with use of the coordinate value obtained by the conversion section; and a display section for three-dimensionally displaying the force model image generated by the image generating section.

7 Claims, 12 Drawing Sheets

(51) Int. Cl.
*G06T 17/10* (2006.01)
*G06T 19/20* (2011.01)
*B25J 9/16* (2006.01)
*B25J 19/02* (2006.01)
*B25J 13/06* (2006.01)
*B25J 13/08* (2006.01)
*G06T 19/00* (2011.01)

(52) U.S. Cl.
CPC ............... *B25J 19/02* (2013.01); *G06T 17/10* (2013.01); *G06T 19/00* (2013.01); *G06T 19/20* (2013.01); *G06T 2200/24* (2013.01); *G06T 2219/2016* (2013.01); *Y10S 901/46* (2013.01)

(56) References Cited

FOREIGN PATENT DOCUMENTS

| | | |
|---|---|---|
| JP | H8-287291 A | 11/1996 |
| JP | 2006-977 A | 1/2006 |
| JP | 2009-269155 A | 11/2009 |
| JP | 2013-43232 A | 3/2013 |
| JP | 2015-171747 A | 10/2015 |
| JP | 2016-13579 A | 1/2016 |
| JP | 2017-001122 A | 1/2017 |

\* cited by examiner

ROBOT SYSTEM, PROCESSING DEVICE AND TEACH PENDANT, HAVING EXTERNAL FORCE DISPLAYING FUNCTION

RELATED APPLICATIONS

The present application claims priority to Japanese Patent Application No. 2017-077702 filed on Apr. 10, 2017, the disclosure of which is hereby incorporated by reference herein in its entirety.

BACKGROUND OF THE INVENTION

1. Field of the Invention

The present invention relates to a robot system having an external force displaying function. The present invention also relates to a processing device having an external force displaying function. The present invention further relates to a teach pendant having an external force displaying function.

2. Description of the Related Art

Robot systems including a force sensor configured to detect a contact force applied to a robot have been known (see, e.g., Japanese Unexamined Patent Publication No. 2015-171747 (JP 2015-171747 A)). In a robot system described in JP 2015-171747 A, a force sensor is attached to an articulated robot, and a contact force when a robot arm is in contact with an external environment is calculated by subtracting an estimated internal force and a force correction amount from a current output of the force sensor. The robot system is configured to stop the robot arm when the contact force exceeds a predetermined value.

On the other hand, robot systems including a force detection section configured to detect a force acting between a working tool and a workpiece and a display section configured to display the force detected by the force detection section have been known (see, e.g., Japanese Unexamined Patent Publication No. 2017-001122 (JP 2017-001122 A)). In a robot system described in JP 2017-001122 A, a force sensor is attached to a robot arm, and a display section displays a force acting between a working tool and a workpiece, detected by the force sensor, as a line segment or a graphic having a line-segmental shape (e.g., a vector shape), the origin of which corresponds to a point of application of force on a workpiece surface or a point in the vicinity thereof.

SUMMARY OF THE INVENTION

In a system configuration in which an external force applied to a robot is detected and displayed, there is a need for an improvement that enables magnitude and direction of the detected external force to be displayed by an image so that the magnitude and the direction can be not only visually identified but also intuitively understood.

One aspect of the present disclosure is a robot system comprising a robot; a detection section configured to detect an external force applied to the robot; a conversion section configured to convert magnitude and direction of the external force detected by the detection section into a coordinate value of a three-dimensional rectangular coordinate system; an image generating section configured to generate a force model image representing the magnitude and the direction of the external force by a graphic, with use of the coordinate value obtained by the conversion section; and a display section configured to three-dimensionally display the force model image generated by the image generating section.

Another aspect of the present disclosure is a processing device comprising an external force obtaining section configured to obtain an external force applied to a robot; a conversion section configured to convert magnitude and direction of the external force obtained by the external force obtaining section into a coordinate value of a three-dimensional rectangular coordinate system; an image generating section configured to generate a force model image representing the magnitude and the direction of the external force by a graphic, with use of the coordinate value obtained by the conversion section; and a display processing section configured to perform a three-dimensionally display processing for the force model image generated by the image generating section.

A further aspect of the present disclosure is a teach pendant comprising a display section configured to three-dimensionally display a force model image representing magnitude and direction of an external force applied to a robot by a graphic.

The robot system according to one aspect has a configuration wherein the conversion section converts the magnitude and the direction, of the external force detected by the detection section, into the coordinate value of the three-dimensional rectangular coordinate system, the image generating section generates the force model image representing the magnitude and the direction of the external force by the graphic by using the coordinate value, and the display section three-dimensionally displays the force model image, so that it is possible for a viewer of the force model image to not only visually identify the magnitude and the direction of the external force applied to the robot but also intuitively understand or determine the degree of the magnitude and the orientation of the applied external force.

In the processing device according to the other aspect and the teach pendant according to the further aspect, effects corresponding to the above-described effects achieved by the robot system can be obtained.

BRIEF DESCRIPTION OF THE DRAWINGS

The objects, features and advantages of the present disclosure will become more apparent from the following description of the embodiments in connection with the accompanying drawings, wherein.

DETAILED DESCRIPTION

Figure 1:
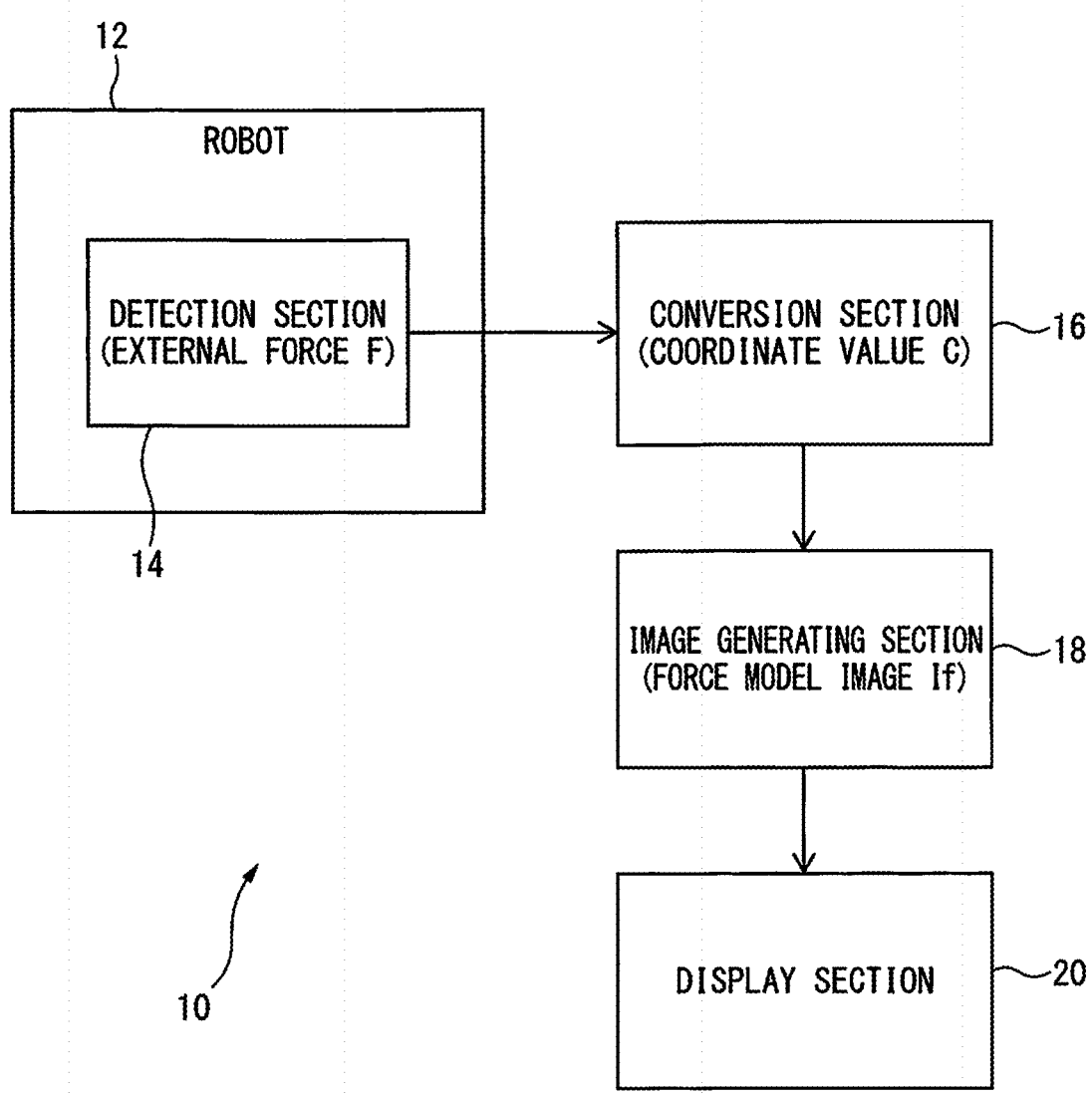
FIG. 1 is a functional block diagram illustrating a configuration of a robot system according to one aspect.

Embodiments of the present disclosure will be described below with reference to the accompanying drawings. Throughout the drawings, corresponding components are denoted by common reference numerals.

FIG. 1 illustrates a configuration of a robot system 10 according to one aspect of the present disclosure, by using functional blocks. The robot system 10 includes a robot 12; a detection section 14 configured to detect an external force F applied to the robot 12; a conversion section 16 configured to convert magnitude and direction of the external force F detected by the detection section 14 into a coordinate value C of a three-dimensional rectangular coordinate system; an image generating section 18 configured to generate a force model image If representing the magnitude and the direction of the external force F by a graphic, with use of the coordinate value C obtained by the conversion section 16; and a display section 20 configured to three-dimensionally display the force model image If generated by the image generating section 18.

The robot 12 includes a mechanical section (also referred to as a robot arm) which is suitably selected from known various mechanical sections, such as an articulated type, a gantry type, a parallel link type, etc., and can perform various tasks, such as handling, machining, etc., with respect to an object by using an end effector, such as a hand, a tool, etc., attached to a distal end of the mechanical section. The detection section 14 may be configured as a desired number of sensors, such as a force sensor, an acceleration sensor, etc., provided for the robot 12, or a detection circuit which detects a load of a desired operation axis of the robot 12, etc. The detection section 14 may also have a configuration of detecting the external force F applied to the robot 12 as, e.g., axial components of force in respective axes of the three-dimensional rectangular coordinate system. Note that in the present disclosure, a configuration of the robot 12 or the detection section 14 is not particularly limited.

The conversion section 16 may be configured as one function (or hardware) of an arithmetic processing unit, such as a central processing unit (CPU) of a computer, etc. Alternatively, the conversion section 16 may be configured as a software for making an arithmetic processing unit, such as a CPU of a computer, etc., operate. The conversion section 16 extracts the magnitude and the direction of the external force F from data of the external force F detected by the detection section 14, and executes a calculation for converting the magnitude and the direction into the coordinate value C (fx, fy, fz) of the three-dimensional rectangular coordinate system. The coordinate value C obtained by the conversion section 16 is used for generating the force model image If suitably displayed in the display section 20, and a coordinate system set for the display section 20 may be used as the three-dimensional rectangular coordinate system for the coordinate value C.

The image generating section 18 may be configured as one function (or hardware) of an arithmetic processing unit, such as a CPU of a computer, etc. Alternatively, the image generating section 18 may be configured as a software for making an arithmetic processing unit, such as a CPU of a computer, etc., operate. The image generating section 18 prepares, with use of the coordinate value C (fx, fy, fz) obtained by the conversion section 16, a single solid graphic that enables an image viewer to intuitively understand or determine the magnitude and the direction of the external force F, and generates the force model image If represented by the solid graphic. One example of the solid graphic of the force model image If may be a graphic having a conical profile as described later. In a case of the force model image If having a conical profile, the image generating section 18 can generate the force model image If, in which the origin of the three-dimensional rectangular coordinate system for the coordinate value C is set at the center of a bottom of a circular cone and the magnitude and the direction of the external force F, expressed by the coordinate value C, are respectively represented by a distance and a direction from the bottom center to a vertex of the circular cone. Note that the "magnitude of the external force F" represented by the force model image If does not mean a numerical value itself of the external force F, but means a degree of the magnitude of the external force F (e.g., a ratio relative to a predetermined external-force limit).

The display section 20 may include a display unit, such as a liquid crystal display (LCD), an organic light-emitting diode (OLED) display, etc., and a display processing section configured to perform data processing for displaying an image on a screen of the display unit. The display section 20 three-dimensionally displays the force model image If generated by the image generating section 18 on the screen of the display unit. Note that in the present disclosure, performing the "three-dimensional display" means, for example, displaying a three-dimensional range image which represents a depth, displaying an image while, e.g., rotating the image so as to enable an image viewer to confirm three-dimensional information, etc.

Figure 2:
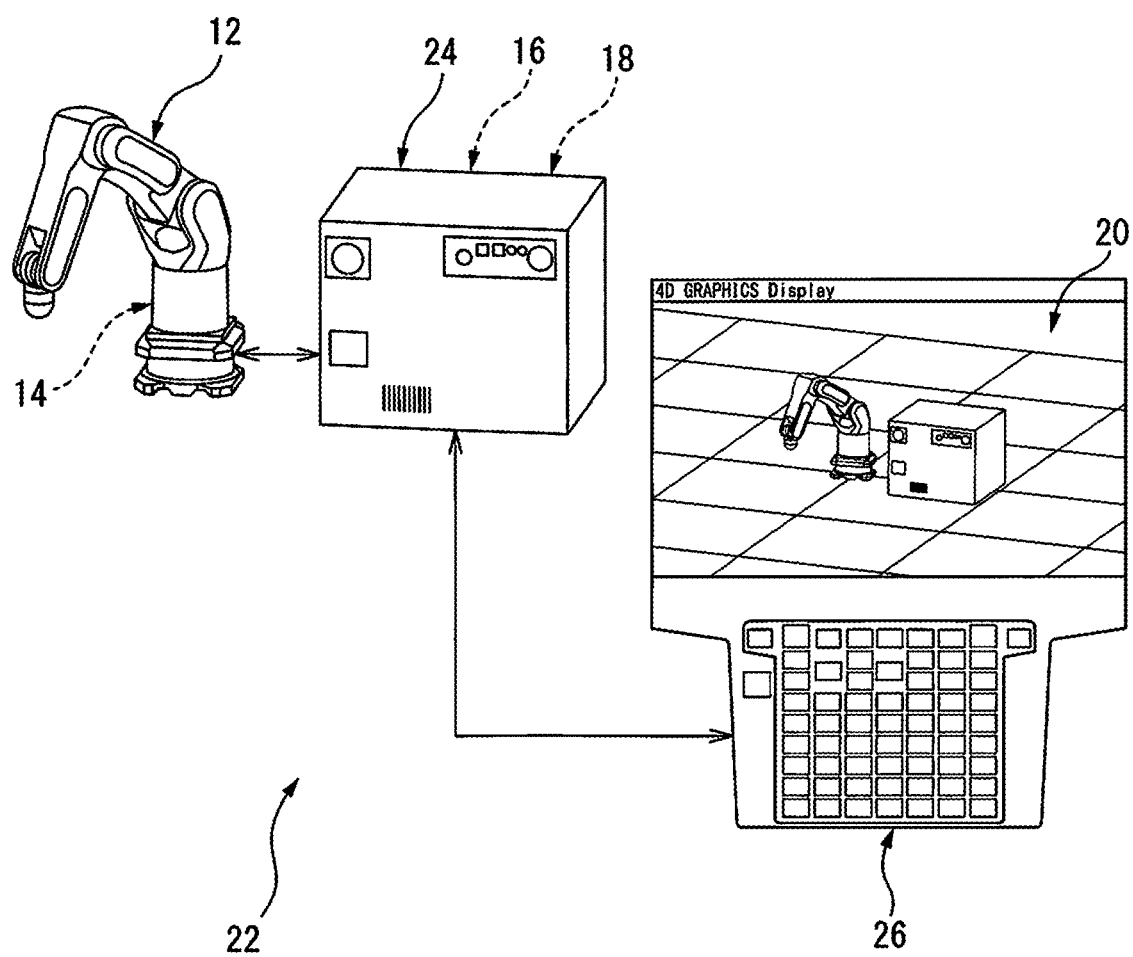
FIG. 2 is a diagram schematically illustrating a robot system according to one embodiment.

FIG. 2 schematically illustrates a robot system 22 according to one embodiment, which has the aforementioned basic configuration of the robot system 10. In the robot system 22 of FIG. 2, the detection section 14 is installed within the robot 12 including a vertical articulated mechanical section, and a robot controller 24 for controlling the robot 12 is provided with the functions of the conversion section 16 and the image generating section 18. Further, a portable teach pendant 26 is connected to the robot controller 24, and the teach pendant 26 is provided with the display section 20 including the display unit and the display processing section. Note that the function of the display processing section of the display section 20 may be assigned to the robot controller 24. Alternatively, the robot controller 24 or a host controller (not depicted) thereof may be provided with the display section 20. The robot controller 24 can control various operations related to a task performed by the robot 12 and can control not only an operation of each axis of the mechanical section but also an operation of an end effector (not depicted) attached to the distal end of the mechanical section.

FIGS. 3 to 6 illustrate an example of a display screen 28 of the display section 20. As illustrated, the display section 20 can three-dimensionally display the force model image If together with a robot model image Ir representing a present orientation of the robot 12. In this configuration, the image generating section 18 (FIG. 1) can generate the robot model image Ir in addition to the generation of the force model image If. The display section 20 can colorfully display the force model image If and the robot model image Ir.

In the example illustrated in FIGS. 3 to 6, the force model image If generated by the image generating section 18 is prepared to represent the magnitude and the direction of the external force F by the graphic having a conical profile extending and tapering from a spherical surface of a spherical body S toward a center of the latter. In the illustrated example, the image generating section 18 generates the spherical body S and the robot model image Ir, both represented by a three-dimensional range image having a depth, and the display section 20 displays the spherical body S superimposed on the robot model image Ir. In the illustrated example, the spherical body S is disposed at a position where the center of the spherical body substantially coincides with a center of the robot model image Ir, and a screen image is displayed as if the robot 12 (FIG. 2) is enclosed by the translucent spherical body S.

In the example illustrated in FIGS. 3 to 6, a circular bottom of the force model image If having the conical profile is placed at a part of the spherical surface of the spherical body S, and a vertex of the force model image If is placed on a line connecting the center of the bottom and the center of the spherical body S. In this display mode, a distance between the bottom center and the vertex, of the force model image If, represents the magnitude of the external force F (FIG. 1) applied to the robot 12, and a direction from the bottom center toward the vertex, of the force model image If, represents the direction of the external force F applied to the robot 12. The image generating section 18 first sets, with use of the coordinate value C obtained by the conversion section 16 (FIG. 1) as described above, the three-dimensional rectangular coordinate system for the coordinate value C on the spherical body S in such a manner that the direction of the external force F indicated by the coordinate value C coincides with a direction from the spherical surface toward the center of the spherical body S. Then, the image generating section 18 prepares, on the spherical surface of the spherical body S, a circle having an arbitrary diameter, the center of which corresponds to the origin of the coordinate system disposed on the spherical surface, and prepares a circular cone having a bottom formed by the prepared circle and representing the magnitude of the external force F indicated by the coordinate value C by a distance between the coordinate system origin and the vertex, so that the image generating section 18 can generate the force model image If configured as a part of the spherical body S.

Figure 3:
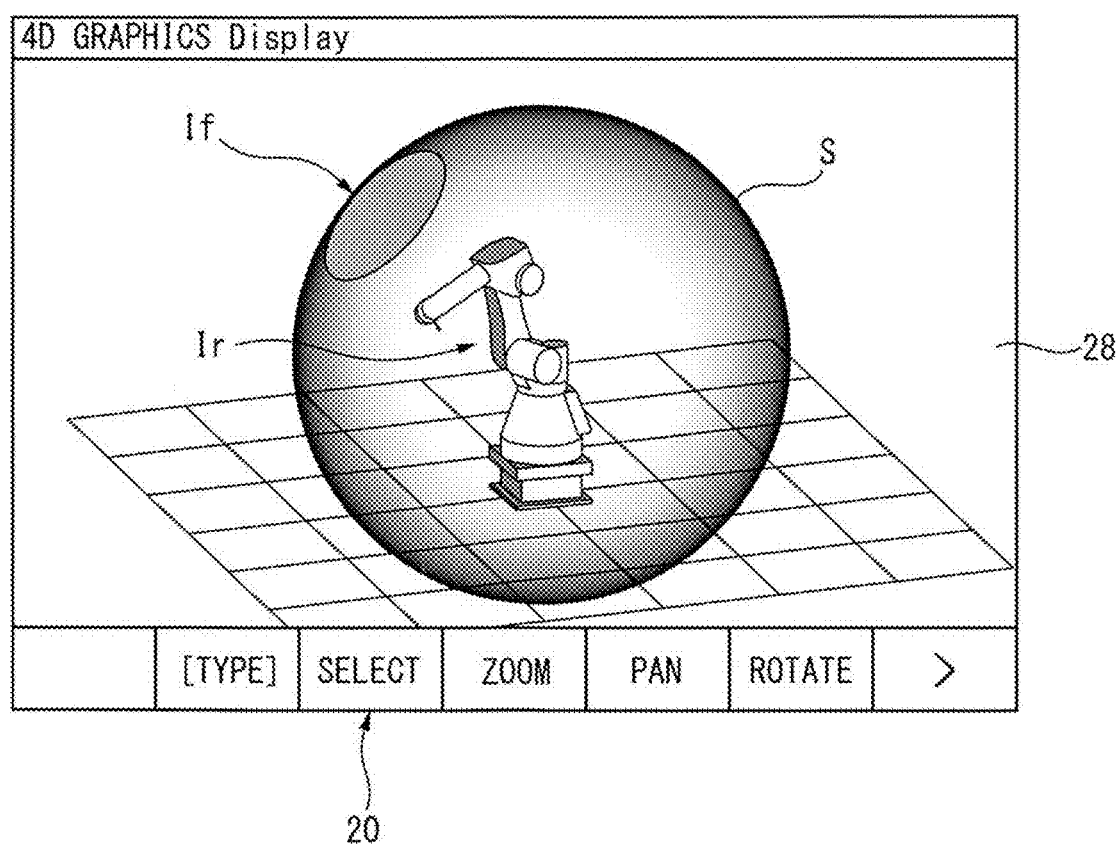
FIG. 3 is a diagram illustrating one example of a display screen.

The force model image If as illustrated in FIGS. 3 to 6 is displayed in the display section 20 together with the robot model image Ir representing the present orientation of the robot 12, so that depending on the direction of the external force F applied to the robot 12, a situation may be caused, in which only the bottom of the force model image If is displayed on the spherical surface of the spherical body S as illustrated, e.g., in FIG. 3. In order to cope with the above display situation, the display section 20 has a function of rotating the force model image If in a three-dimensional direction on the screen. The display section 20 can also rotate the robot model image Ir together with the force model image If in a three-dimensional direction.

Figure 4:
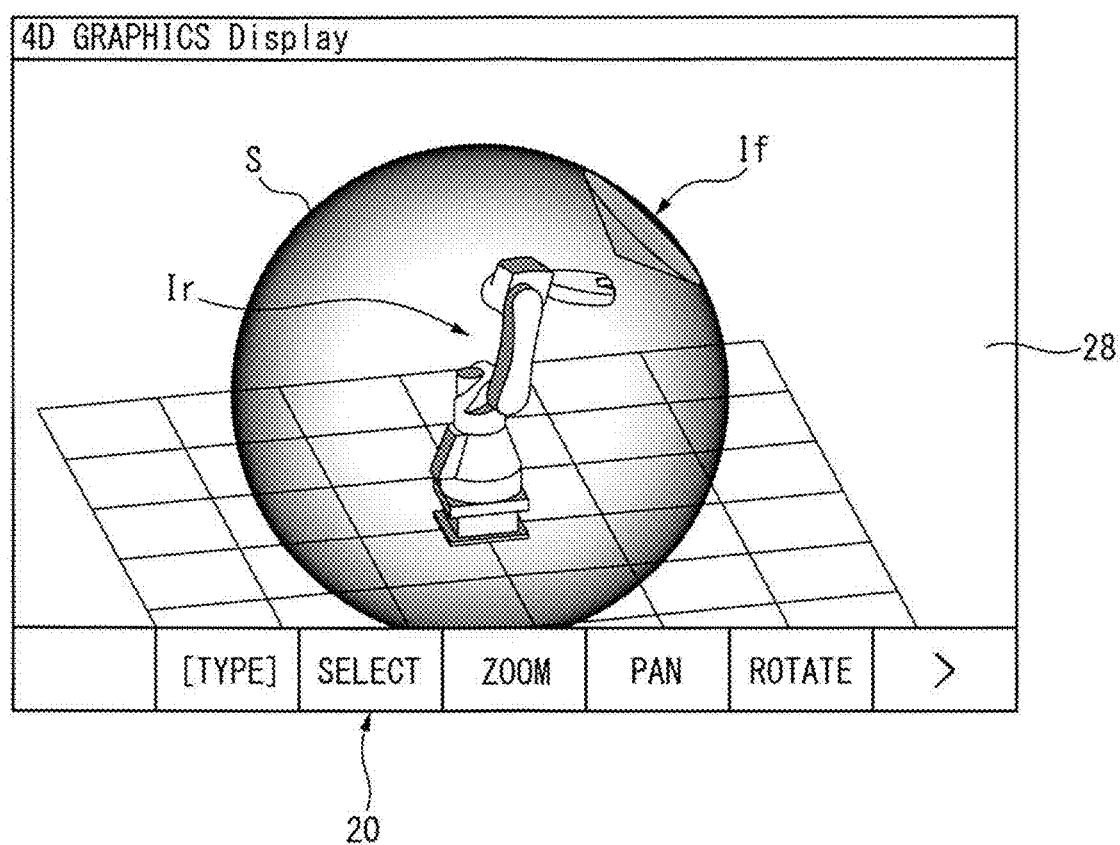
FIG. 4 is a diagram illustrating another example of the display screen.
Figure 5:
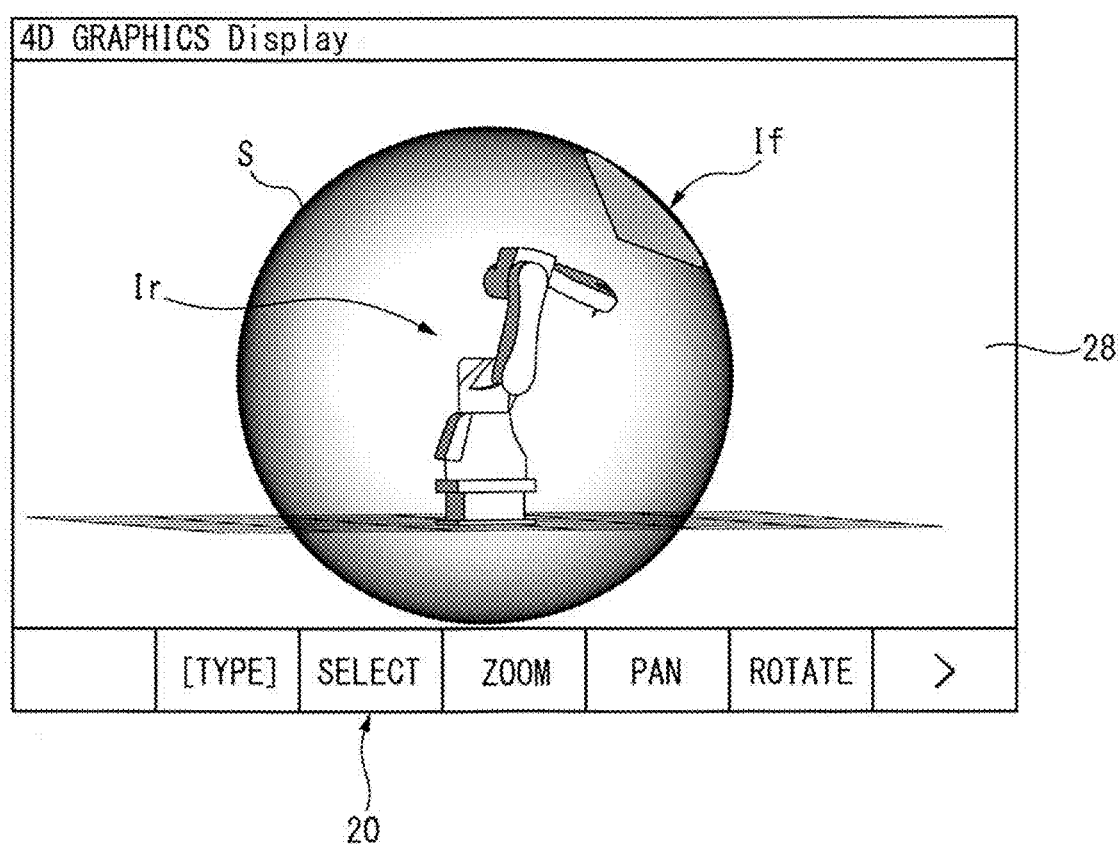
FIG. 5 is a diagram illustrating a further example of the display screen.

For example, as illustrated, e.g., in FIG. 4, the force model image If and the robot model image Ir can be rotated about a vertical axis (invisible) extending vertically in the display screen 28 of FIG. 3, so as to enable the force model image If having the visible vertex of the circular cone to be displayed. By adjusting a rotation amount from the image of FIG. 3 to the image of FIG. 4, it is possible to display the force model image If in the display section 20, of which the magnitude of the external force F can be more correctly determined or understood. Further, as illustrated, e.g., in FIG. 5, the force model image If and the robot model image Ir can be rotated about a horizontal axis (invisible) extending horizontally in the display screen 28 of FIG. 4, so as to enable the force model image If having the vertex of the circular cone, which is visible from another direction, to be displayed. By adjusting a rotation amount from the image of FIG. 4 to the image of FIG. 5, it is possible to display the force model image If in the display section 20, of which the direction of the external force F can be more correctly determined or understood. The display section 20 may be configured to be capable of rotating the force model image If and the robot model image Ir in every three-dimensional direction over a desired angle in accordance with, e.g., an instruction of an operator.

As described above, the image generating section 18 can represent the magnitude of the external force F by a height (i.e., a distance from the bottom center to the vertex) of the force model image If. One example may have a configuration in which, as the external force F increases, the height of the force model image If increases. A radius of the spherical body S may be set to a size enabling an image viewer to easily identify a change in the height of the force model image If. For example, a radius of the spherical body S may be set so as to correspond to 100% of a predetermined external force limit. Further, the display section 20 may be also configured to be capable of freely changing a radius of the spherical body S in accordance with, e.g., an instruction of an operator. Note that a graphic used for the force model image If is not limited to the illustrated graphic having a conical profile, and various solid graphics capable of representing the magnitude and the direction of the external force F can be employed.

The image generating section 18 may be configured to generate the force model image If with a radius of the spherical body S being equal to zero. In this configuration, for example, the origin of a three-dimensional rectangular coordinate system for the robot model image Ir, which is set in advance in the display section 20, is placed at the center of the robot model image Ir (i.e., the center of the spherical body S having zero radius), and the coordinate value C is applied to the preset three-dimensional rectangular coordinate system so as to prepare a solid graphic pointing radially outward from the center of the robot model image Ir, so that the image generating section 18 can generate the force model image If representing the magnitude and the direction of the external force F.

The image generating section 18 may be configured to generate the force model image If having a color varying in accordance with the magnitude of the external force F. By way of example, in the case where the external force F detected by the detection section 14 is less than or equal to a predetermined ratio (e.g., 80%) with respect to a predetermined external force limit, the force model image If having a color indicating a safe state (e.g., blue color) may be generated, and in the case where the external force F detected by the detection section 14 exceeds the above predetermined ratio, the force model image If having a color indicating a danger state (e.g., red color) may be generated. The display section 20 can three-dimensionally display the force model image If generated with a color corresponding to the magnitude of the external force F. Further, the display section 20 may transparentize the spherical body S. The display section 20 may be also configured to be capable of freely changing a degree of transparency of the spherical body S or a color thereof, in accordance with, e.g., an instruction of an operator.

Figure 6:
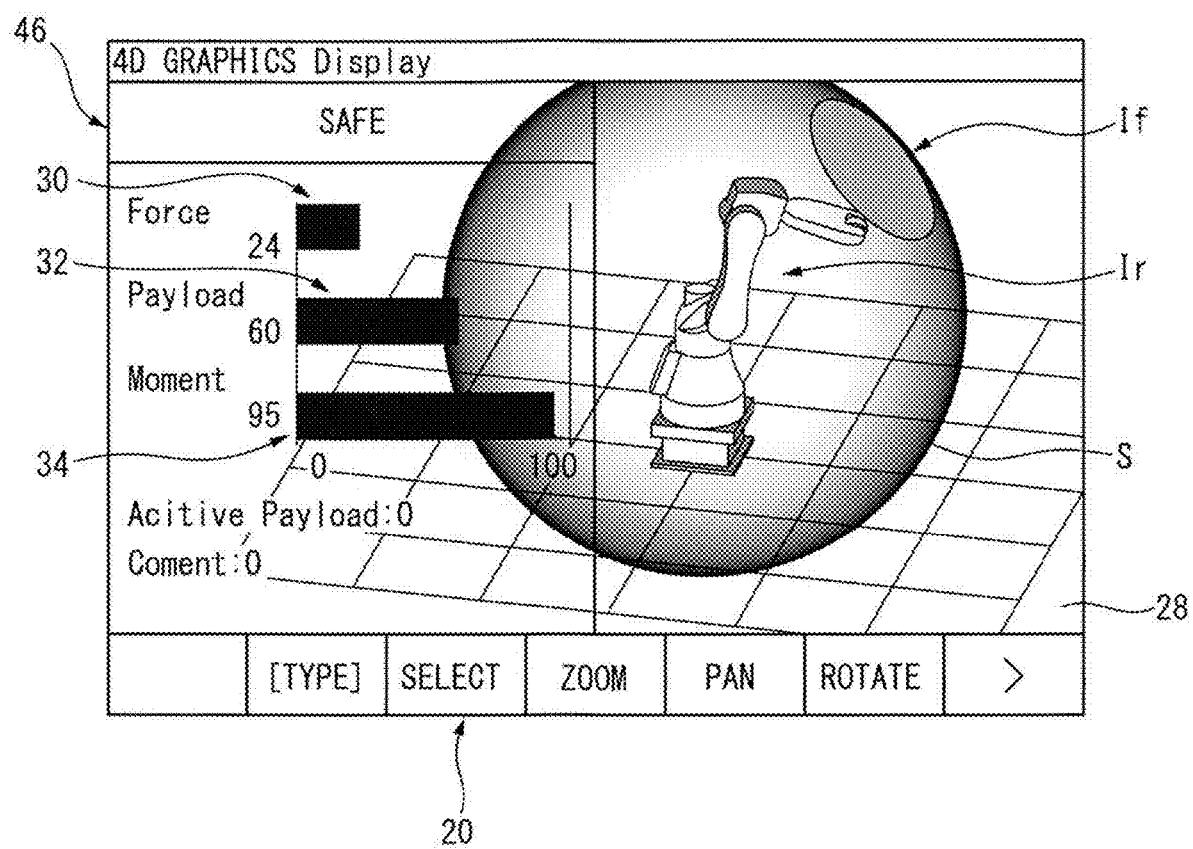
FIG. 6 is a diagram illustrating a further example of the display screen.

As illustrated in FIG. 6, the image generating section 18 may be configured to generate a graph image 30 representing the magnitude of the external force F. In an example of FIG. 6, the graph image 30 is generated as a bar graph indicating a ratio of the external force F relative to a predetermined external force limit. Further, in the example of FIG. 6, in addition to the graph image 30 representing the magnitude of the external force F, a graph image 32 representing a magnitude of a payload applied to an operation axis of the robot 12 and a graph image 34 representing a magnitude of a moment, are generated as an analogous bar graph. The display section 20 can three-dimensionally display the force model image If and display the graph images 30, 32, 34 on the same display screen 28.

The image generating section 18 may be configured to generate the graph image 30 having a color varying in accordance with the magnitude of the external force F. By way of example, in the case where the external force F detected by the detection section 14 is less than or equal to a predetermined ratio (e.g., 80%) with respect to a predetermined external force limit, the graph image 30 having a color indicating a safe state (e.g., green color) may be generated, and in the case where the external force F detected by the detection section 14 exceeds the above predetermined ratio, the graph image 30 having a color indicating a danger state (e.g., red color) may be generated. Further, by setting a plurality of stages of threshold values for the external force F, the graph image 30 having a color indicating a slightly danger state (e.g., yellow color) may be also generated. The display section 20 can display the graph image 30 generated with a color corresponding to the magnitude of the external force F. The display section 20 may be also configured to be capable of freely changing a threshold value of the external force F or a color of the graph image 30 in accordance with, e.g., an instruction of an operator. The graph images 32, 34 may be configured analogously to the graph image 30.

The robot system 10, 22 having the aforementioned configuration has a configuration wherein the conversion section 16 converts the magnitude and the direction, of the external force F detected by the detection section 14, into the coordinate value C of the three-dimensional rectangular coordinate system, the image generating section 18 generates the force model image If representing the magnitude and the direction of the external force F by the graphic by using the coordinate value C, and the display section 20 three-dimensionally displays the force model image If, so that it is possible for a viewer of the force model image If to not only visually identify the magnitude and the direction of the external force F applied to the robot 12 but also intuitively determine or understand the degree of the magnitude and the orientation of the applied external force F.

For example, in the case where the robot system 10, 22 includes a robot 12 capable of safely performing a collaborative operation with a human being (so called a collaborative robot), a system configuration ensuring safety of the human being is usually adopted, in which the robot 12 is forcibly stopped when the external force F detected by the detection section 14 exceeds a predetermined external force limit. In this configuration, in order to allow the robot 12 to restart the operation after being stopped, it is necessary to specify the external force F resulting in the stoppage and eliminate the cause of the external force F. In order to specify the external force F, it is useful to grasp the direction of the external force F applied to the robot 12 at an instant when the robot 12 is stopped. According to the robot system 10, 22, a viewer of the force model image If (e.g., an operator of the robot system 10, 22) can intuitively determine or understand the degree of the magnitude and the orientation of the applied external force F, so that it is possible, after the stoppage of the robot 12, to specify the external force F and promptly eliminate the cause thereof, and thereby reduce man hours for recovering or reconstructing the robot system 10, 22 so as to prevent operation efficiency from decreasing.

According to the configuration wherein the display section 20 three-dimensionally displays both of the force model image If and the robot model image Ir, it is possible for a viewer to further assuredly determine or understand the degree of the magnitude and the orientation of the external force F relative to the robot 12. Further, according to the configuration wherein the force model image If is generated by using the graphic having the conical profile extending from the spherical surface toward the center of the spherical body S, it is possible for a viewer to easily and intuitively determine or understand a state where a force applied from the outside to the robot 12 (i.e., the external force F) is applied in such a manner as to push the robot 12 in a tapering direction of the circular cone. Still further, according to the configuration wherein the force model image If having a color varying in accordance with the magnitude of the external force F is displayed, it is possible to further facilitate the intuitive determination.

Figure 7:
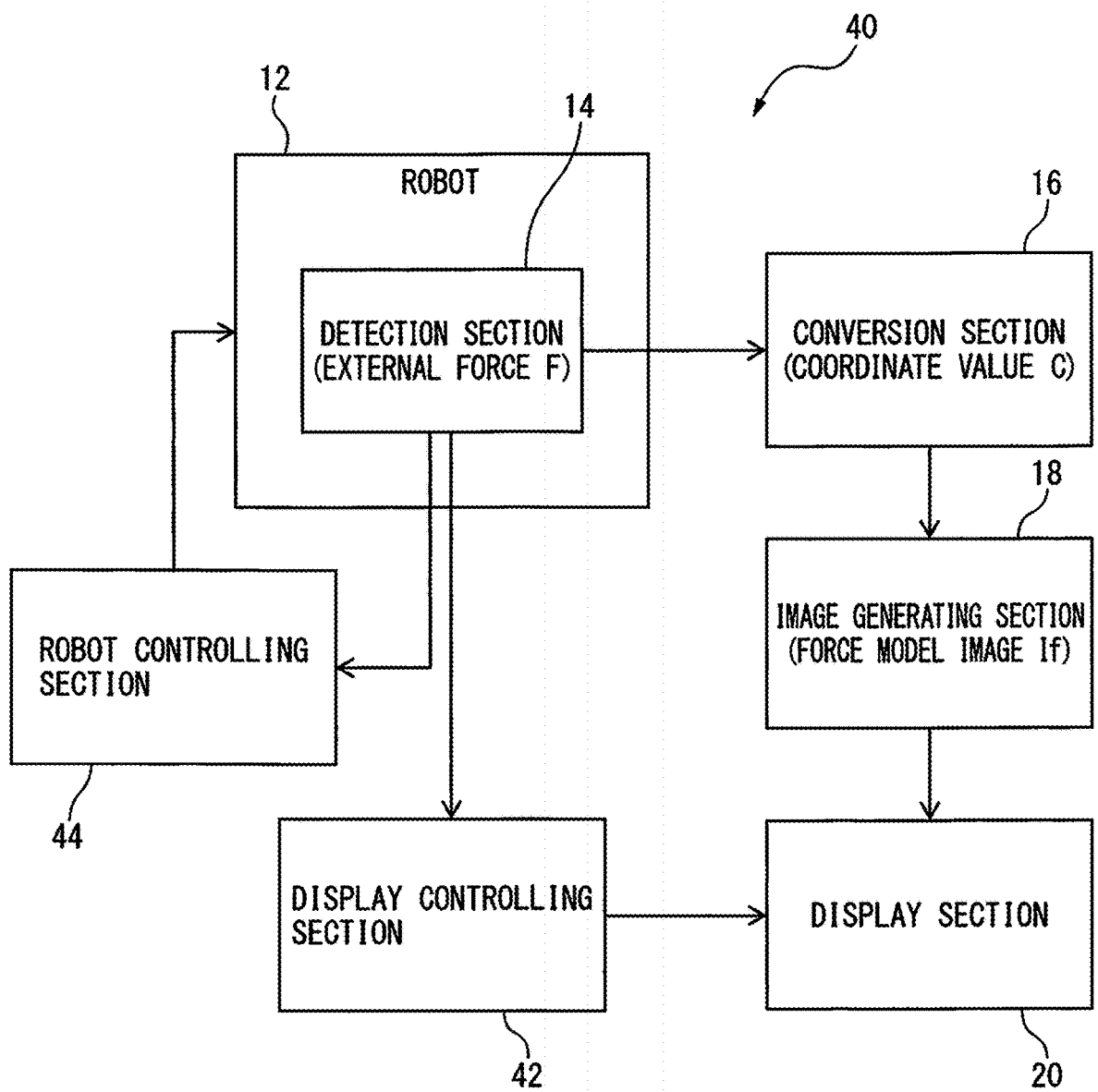
FIG. 7 is a functional block diagram illustrating a robot system according to another embodiment.

FIG. 7 illustrates a robot system 40 according to another embodiment, which has the aforementioned basic configuration of the robot system 10, by using functional blocks. Components of the robot system 40, which correspond to the components of the robot system 10, are denoted by common reference signs with those of the latter, and the detailed description of the corresponding components will be omitted as appropriate.

The robot system 40 includes a display controlling section 42 configured to compare the magnitude of the external force F detected by the detection section 14 with a predetermined threshold value and make the display section 20 display the force model image If when the magnitude of the external force F exceeds the threshold value. The display controlling section 42 may be configured as one function (or hardware) of an arithmetic processing unit, such as a central processing unit (CPU) of a computer, etc., or may be configured as a software for making the arithmetic processing unit operate. In the robot system 22 of FIG. 2, the function of the display controlling section 42 may be assigned to the robot controller 24 or the teach pendant 26. The display controlling section 42 may be configured in such a manner as to not allow the display section 20 to display the force model image If unless the magnitude of the external force F exceeds the threshold value, but allow the display section 20 to display the force model image If only when the magnitude of the external force F exceeds the threshold value and maintain such a displaying state. This configuration can reduce a computational load relating to the three-dimensionally displaying of the force model image If.

The threshold value of the external force F, used in the display controlling section 42, may be set in a range, e.g., from 50% to 100% of a predetermined external force limit. In the case where the threshold value of the external force F corresponds to 100% of the external force limit (i.e., threshold value is equal to limit value) and the robot system 40 includes the aforementioned collaborative robot 12, a configuration may be made in such a manner that the display section 20 displays the force model image If representing the magnitude and the direction of the external force F, at an instant when the external force F exceeds the predetermined external force limit and the robot 12 is forcibly stopped, and such a displaying state is maintained. The above configuration allows, for example, an operator of the robot system 40 to observe the force model image If displayed by the display section 20 after the robot 12 is stopped, so as to determine the magnitude and the direction of the external force F resulting in the stoppage of the robot 12, and thereby promptly perform a system recovery operation.

The robot system 40 includes a robot controlling section 44 configured to compare the magnitude of the external force F detected by the detection section 14 with a predetermined external force limit (or limit value), and make the robot 12 stop when the magnitude of the external force F exceeds the external force limit. The robot controlling section 44 may be configured as one function (or hardware) of an arithmetic processing unit, such as a central processing unit (CPU) of a computer, etc., or may be configured as a software for making the arithmetic processing unit operate. In the robot system 22 of FIG. 2, the function of the robot controlling section 44 may be assigned to the robot controller 24. In the case where, for example, the robot system 40 includes the aforementioned collaborative robot 12, the robot controlling section 44 may be configured to forcibly stop the robot 12 when the external force F exceeds the predetermined external force limit. Note that the robot system 40 may include at least one of the display controlling section 42 and the robot controlling section 44.

In the robot system 40, as illustrated in FIG. 6, the display section 20 may display a stop notification field 46 for visually notifying a stoppage of the robot 12. In the stop notification field 46, for example, a color (e.g., green color) and a character (e.g., "SAFE"), which indicate safety, may be displayed during a period when the robot 12 normally operates, and a color (e.g., red color) and a character (e.g., "STOP"), which indicate danger, may be displayed during a period when the robot 12 is forcibly stopped.

Figure 8:
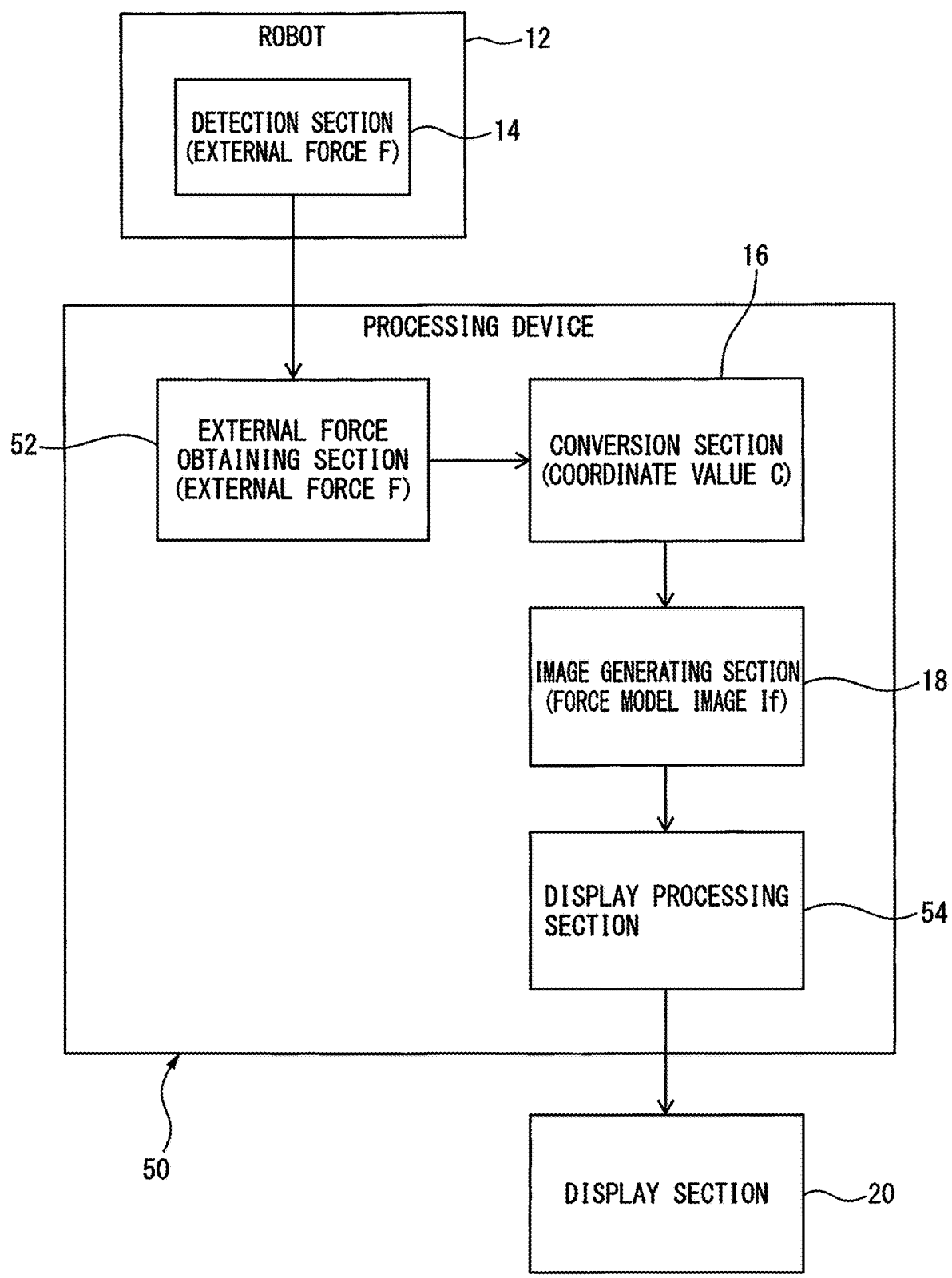
FIG. 8 is a functional block diagram illustrating a configuration of a processing device according to another aspect.

FIG. 8 illustrates a configuration of a processing device 50 according to another aspect of the present disclosure, by using functional blocks. The processing device 50 can have the function of three-dimensionally display processing for the force model image If, provided in the aforementioned robot system 10, 22. Components of the processing device 50, which correspond to the components of the robot system 10, 22, are denoted by common reference signs with those of the latter, and the detailed description of the corresponding components will be omitted as appropriate.

The processing device 50 includes an external force obtaining section 52 configured to obtain an external force F applied to a robot 12; a conversion section 16 configured to convert magnitude and direction of the external force F obtained by the external force obtaining section 52 into a coordinate value C of a three-dimensional rectangular coordinate system; an image generating section 18 configured to generate a force model image If representing the magnitude and the direction of the external force F by a graphic, with use of the coordinate value C obtained by the conversion section 16; and a display processing section 54 configured to perform a three-dimensionally display processing for the force model image If generated by the image generating section 18. The processing device 50 may be configured as an arithmetic processing unit, such as a central processing unit (CPU) of a computer, etc. Each of the external force obtaining section 52, the conversion section 16, the image generating section 18 and the display processing section 54 may be configured as one function (or hardware) of the processing device 50, or may be configured as a software for making the processing device 50 operate. Further, the functions of the external force obtaining section 52, the conversion section 16, the image generating section 18 and the display processing section 54 of the processing device 50 may be assigned respectively to a plurality of processing devices physically distinct from each other.

The external force obtaining section 52 can obtain the external force F applied to the robot 12, detected by the detection section 14 in the robot system 10, 22, from the detection section 14. The conversion section 16 and the image generating section 18 have a function respectively corresponding to the conversion section 16 and the image generating section 18 in the robot system 10, 22. The display processing section 54 can make the display section 20 included in the robot system 10, 22 three-dimensionally display the force model image If.

As described with reference to FIGS. 3 to 6, in the processing device 50, the image generating section 18 may generate a robot model image Ir representing a present orientation of the robot 12, and the display processing section 54 may perform the three-dimensionally display processing for the force model image If and the robot model image Ir. The force model image If generated by the image generating section 18 may be designed to represent the magnitude and the direction of the external force F by the graphic having a conical profile extending from a spherical surface of a spherical body S toward the center of the spherical body S. The image generating section 18 may generate the force model image If having a color varying in accordance with the magnitude of the external force F. The image generating section 18 may generate a graph image 30 representing the magnitude of the external force F, and the display processing section 54 may perform the three-dimensionally display processing for the force model image If and performs a display processing for the graph image 30.

Figure 9:
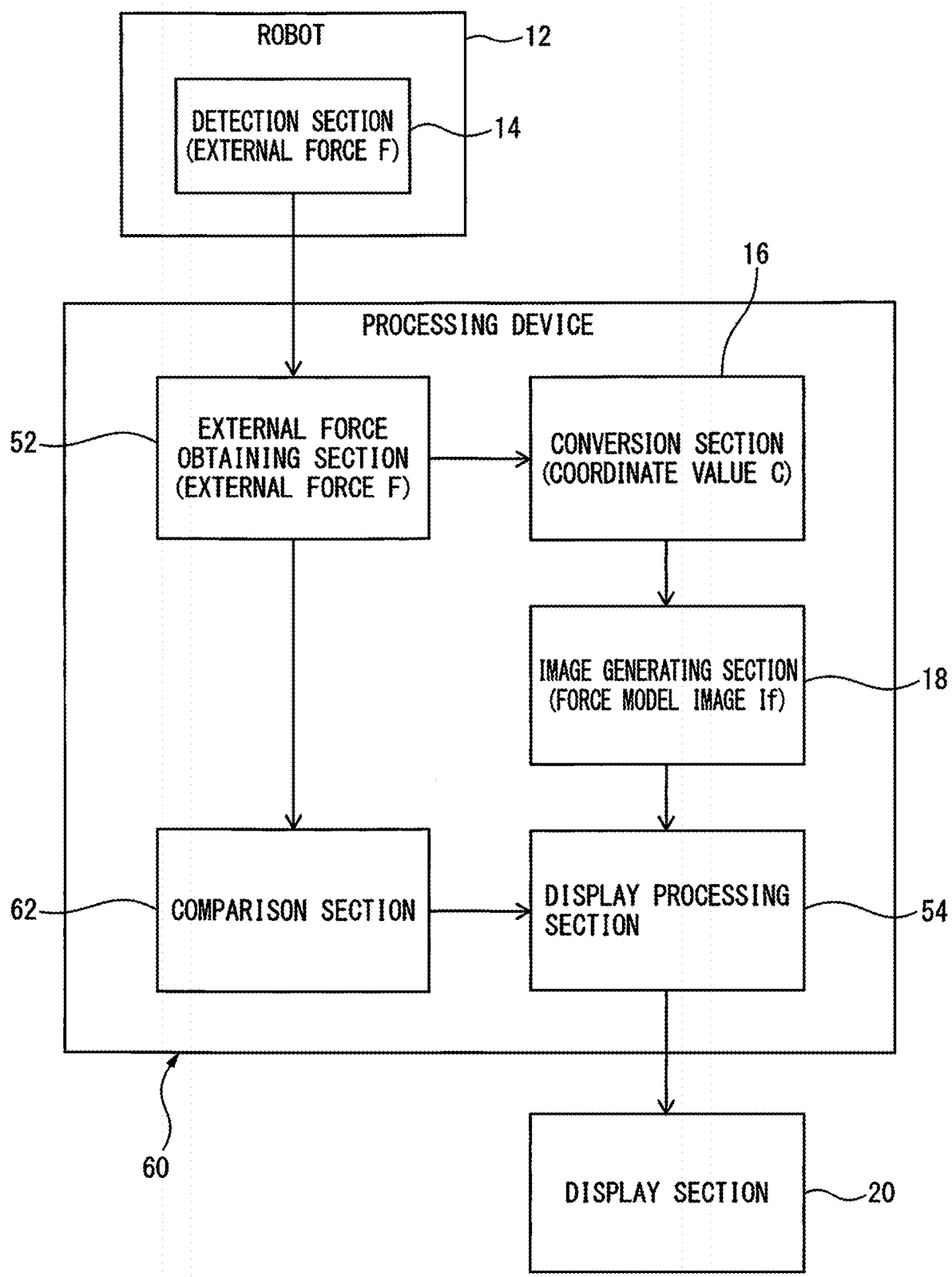
FIG. 9 is a functional block diagram illustrating a processing device according to one embodiment.

FIG. 9 illustrates a processing device 60 according to one embodiment, which has the aforementioned basic configuration of the processing device 50, by using functional blocks. Components of the processing device 60, which correspond to the components of the processing device 50, are denoted by common reference signs with those of the latter, and the detailed description of the corresponding components will be omitted as appropriate. The processing device 60 can have the function of three-dimensionally display processing for the force model image If, provided in the aforementioned robot system 40.

The processing device 60 further includes a comparison section 62 configured to compare the magnitude of the external force F obtained by the external force obtaining section 52 with a predetermined threshold value. The display processing section 54 performs the three-dimensionally display processing for the force model image If when the magnitude of the external force F exceeds the threshold value. The comparison section 62 may be configured as one function (or hardware) of the processing device 60, or may be configured as a software for making the processing device 60 operate. The display processing section 54 can perform the three-dimensionally display processing in such a manner as, under, for example, the aforementioned control of the display controlling section 42 of the robot system 40, to not allow the display section 20 to display the force model image If unless the magnitude of the external force F exceeds the threshold value, but allow the display section 20 to display the force model image If only when the magnitude of the external force F exceeds the threshold value and maintain such a displaying state. This configuration can reduce a computational load relating to the three-dimensionally displaying of the force model image If.

The processing device 50, 60 having the above configuration can produce effects corresponding to the aforementioned effects of the robot system 10, 22, 40.

Figure 10:
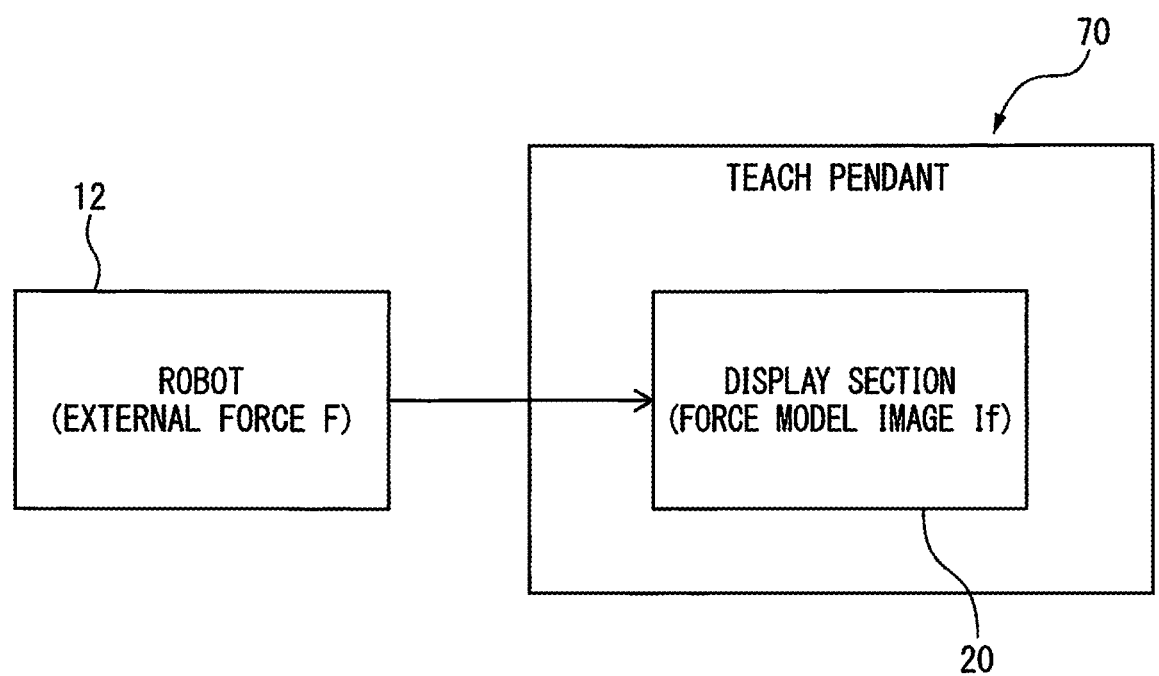
FIG. 10 is a functional block diagram illustrating a configuration of a teach pendant according to a further aspect.

FIG. 10 illustrates a configuration of a teach pendant 70 according to a further aspect of the present disclosure, by using functional blocks. The teach pendant 70 can have the function of three-dimensionally displaying for the force model image If, provided in the aforementioned robot system 10, 22, 40. Components of the teach pendant 70, which correspond to the components of the robot system 10, 22, 40, are denoted by common reference signs with those of the latter, and the detailed description of the corresponding components will be omitted as appropriate.

The teach pendant 70 includes a display section 20 configured to three-dimensionally display a force model image If representing magnitude and direction of an external force F applied to a robot 12 by a graphic. The display section 20 has a function corresponding to the display section 20 in the robot system 10, 22, 40. The display section 20 can three-dimensionally display, on a display screen, the force model image If generated by the image generating section 18 in the robot system 10, 22, 40, or the force model image If processed by the display processing section 54 in the aforementioned processing device 50, 60.

Figure 11:
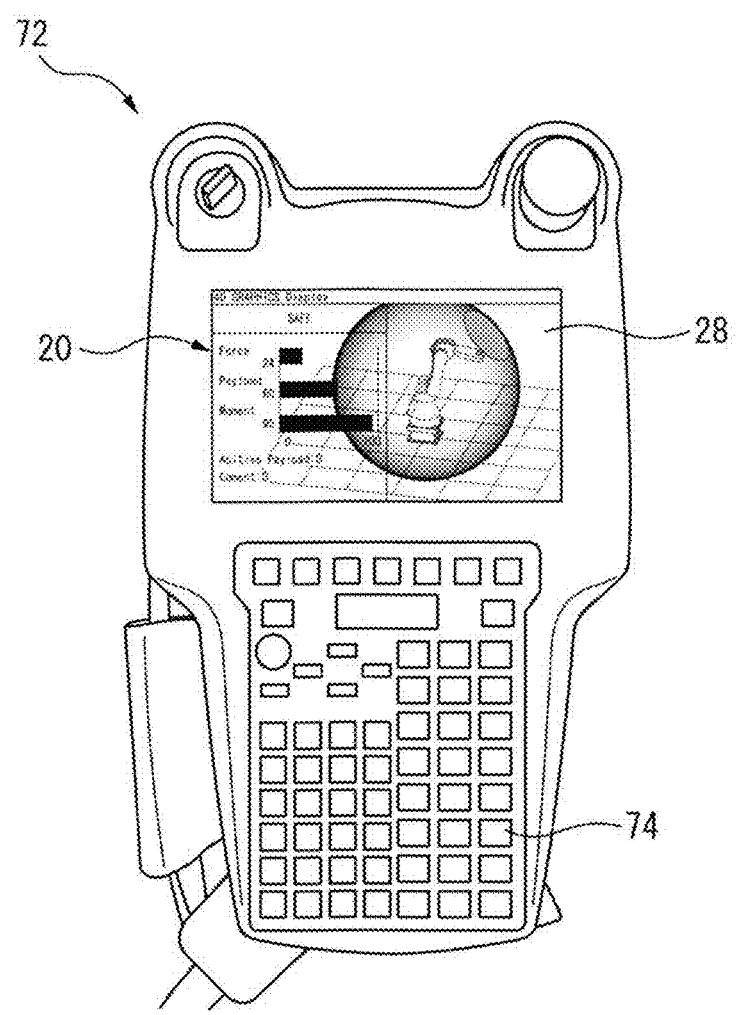
FIG. 11 is a diagram schematically illustrating a teach pendant according to one embodiment.

FIG. 11 schematically illustrates a teach pendant 72 according to one embodiment, which has the aforementioned basic configuration of the teach pendant 70. The teach pendant 72 is a portable user interface device used by, e.g., an operator of the robot system 10, 22, 40 for operating the robot 12, and includes various input keys 74 for inputting an operation command, a display screen 28 for displaying a state of the robot 12, etc.

Figure 12:
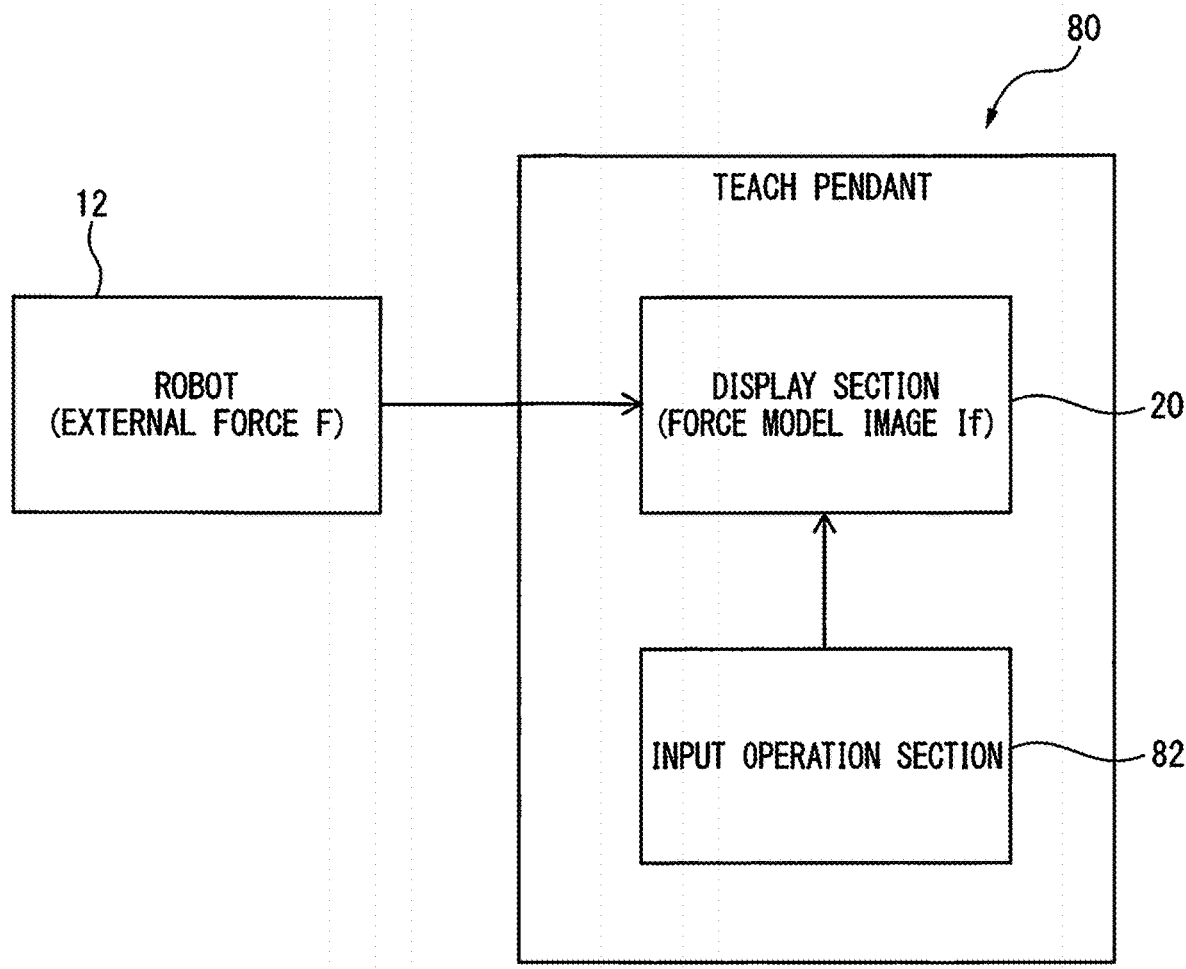
FIG. 12 is a functional block diagram illustrating a teach pendant according to another embodiment.

FIG. 12 illustrates a teach pendant 80 according to another embodiment, which has the aforementioned basic configuration of the teach pendant 70, by using functional blocks. Components of the teach pendant 80, which correspond to the components of the teach pendant 70, are denoted by common reference signs with those of the latter, and the detailed description of the corresponding components will be omitted as appropriate.

The teach pendant 80 includes an input operation section 82 used to make the force model image If rotate in a three-dimensional direction. In the teach pendant 72 of FIG. 11, the function of the input operation section 82 may be assigned to a part of the input keys 74, or a part of the display screen 28 in the case where the display screen 28 has a touch input function. As described with reference to FIGS. 3 to 5, in the teach pendant 80, the input operation section 82 may be operated by, e.g., an operator of the robot system 10, 22, 40 so as to rotate the force model image If in a desired three-dimensional direction, and thereby to make the display section 20 display the force model image If enabling the magnitude and the direction of the external force F to be visually determined or understood.

The teach pendant 70, 72, 80 having the above configuration can produce effects corresponding to the aforementioned effects of the robot system 10, 22, 40.

While the embodiments of the disclosure have been described, it will be understood, by those skilled in the art, that various changes or modifications may be made thereto without departing from the scope of the following claims.

The invention claimed is:

1. A robot system comprising:
   a robot;
   a detection section configured to detect an external force applied to the robot;
   a conversion section configured to convert magnitude and direction of the external force detected by the detection section into a coordinate value of a three-dimensional rectangular coordinate system;
   an image generating section configured to generate a force model image representing the magnitude and the direction of the external force by a graphic, with use of the coordinate value obtained by the conversion section; and
   a display section configured to three-dimensionally display the force model image generated by the image generating section.

2. The robot system of claim 1, further comprising a display controlling section configured to compare the magnitude of the external force detected by the detection section with a predetermined threshold value and make the display section display the force model image when the magnitude exceeds the threshold value.

3. The robot system of claim 1, wherein the image generating section generates a robot model image representing a present orientation of the robot, and wherein the display section three-dimensionally displays the force model image together with the robot model image.

4. The robot system of claim 1, wherein the force model image generated by the image generating section represents the magnitude and the direction of the external force by the graphic having a conical profile extending from a spherical surface of a spherical body toward a center of the spherical body.

5. The robot system of claim 1, wherein the image generating section generates the force model image having a color varying in accordance with the magnitude of the external force.

6. The robot system of claim 1, wherein the image generating section generates a graph image representing the magnitude of the external force, and wherein the display section three-dimensionally displays the force model image and displays the graph image.

7. The robot system of claim 1, further comprising a robot controlling section configured to compare the magnitude of the external force detected by the detection section with a predetermined limit value and make the robot stop when the magnitude exceeds the limit value.

* * * * *